(Model.)
D. TALMAGE & M. L. FLOWERS.
MACHINE FOR REMOVING SEED FROM GRAIN.
No. 252,334. Patented Jan. 17, 1882.
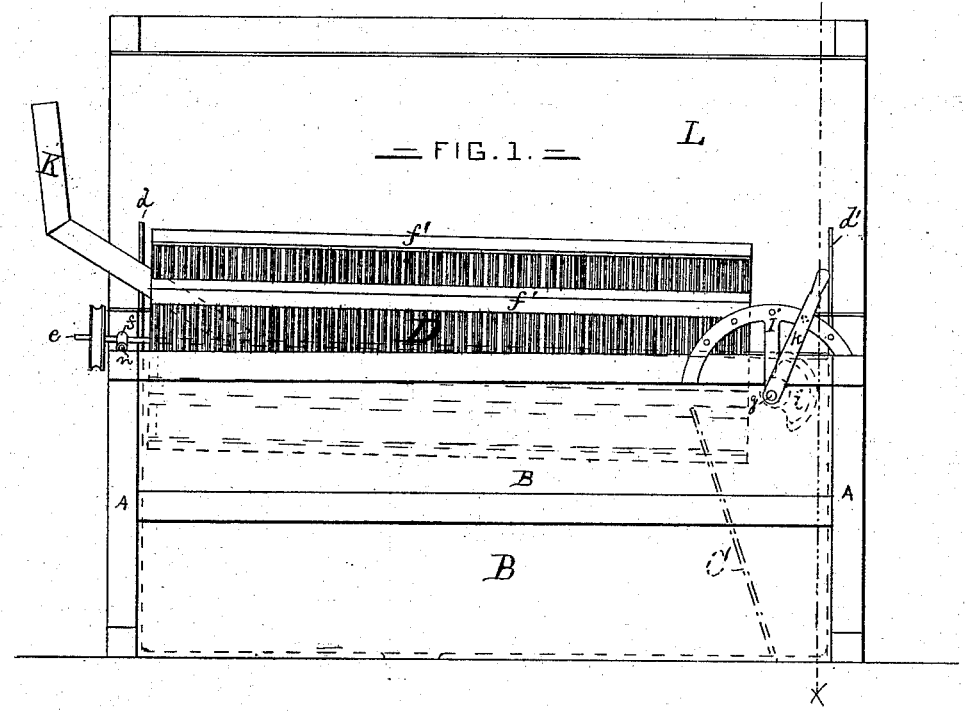
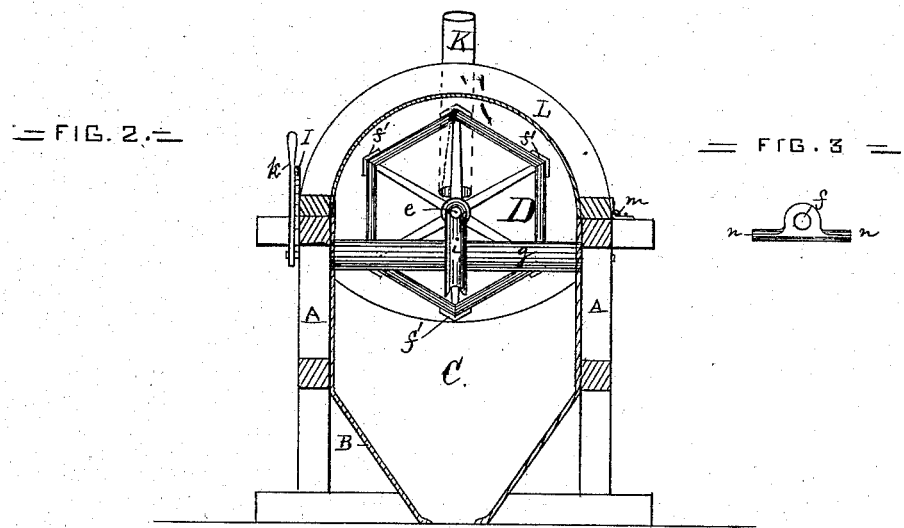
WITNESSES.
P. J. Finney
J. C. Hubbell
INVENTOR.
David Talmage
Martin L. Flowers
BY H. N. Jenkins
ATTORNEY
N. PETERS. Photo-Lithographer, Washington, D. C.

UNITED STATES PATENT OFFICE.

DAVID TALMAGE AND MARTIN L. FLOWERS, OF NEW ORLEANS, LOUISIANA.

MACHINE FOR REMOVING SEED FROM GRAIN.

SPECIFICATION forming part of Letters Patent No. 252,334, dated January 17, 1882.

Application filed October 11, 1880. (Model.)

*To all whom it may concern:*

Be it known that we, DAVID TALMAGE and MARTIN L. FLOWERS, residents of the city of New Orleans, parish of Orleans, and State of Louisiana, have invented a certain new and useful Improvement in Machines for Removing Seed from Grain; and we do hereby declare the following to be a full, clear, and correct description of the same, reference being had to the annexed drawings, making a part of this specification.

The object of this invention, as its title indicates, is to separate and remove from rice or grain of any kind seed and other matter gathered therewith.

Our invention consists of a revolving screen, preferably hexagonal in form, and having its shell constructed of tubing, say, from three-sixteenths to one-half of an inch in diameter, said tubing arranged at right angles to the supporting-shaft, and having their points of intersection strengthened by angle-strips running the whole length of the screen.

A further improvement consists in a means whereby one end of the shaft may be raised or lowered, so as to regulate the flow of the grain through the screen, in combination with an oscillating journal-bearing for the other end of the shaft.

On the accompanying drawings, Figure 1 represents a side elevation with cover raised so as to show more fully the nature of my invention. Fig. 2 is a cross-section through the line *x x* thereof, and Fig. 3 a view of an oscillating journal-box for the support of one end of the shaft.

A is a frame, the interior of which is provided with a casing, B, having a partition near one of its ends, as shown at C, and raised semi-circular ends, as at *d d'*. In one of these ends—say *d*—a vertical slot is made, to permit of the passage as well as operation therein of the shaft *e* of the revolving screen D, one end of which is journaled in an oscillating box, *f*, and the other in a groove formed in the outer edge of a cam or eccentric, *i*, which is keyed on a cross-shaft, *g*, and which is provided at one end with an operating-lever, *k*. The latter is held in any desired position by means of a pin on its inner side being brought in contact with one of a series of perforations formed in a segmental piece, I, that is secured to one side of the frame, as shown. The grain is fed to the interior of the screen D through a pipe, K, which passes through one end of the casing, and has its lower end projecting into the said screen, as shown by dotted lines.

A cover, L, is hinged to one side of the frame, as shown at *m*, and which, if closed when the machine is in operation, will prevent dirt or dust arising from the same from escaping.

The trunnions *n* of the oscillating box *f* operate in suitable bearings that are secured by any desired means to the upper edge of one end of the frame A.

The revolving screen D, constructed of tubing, as hereinbefore stated, secures strength, together with lightness, while at the same time it enables us to employ material of greater diameter than heretofore used in screens of this class, thus producing flutings of increased width and uninterrupted throughout their lengths. The space between each pair of tubes is the same as heretofore, the guiding-surface to the same being alone increased. Thus it is that all flat bodies, following the sides of the tubes, will readily find exit through the spaces between the same. The screen is made hexagonal in form, or any other shape except round, for the purpose of securing a tossing or jumping motion to the grain within the revolving screen, whereby a better separation of seed is secured. The tubes intersect to form a continuous fluted surface throughout, and at their point of intersection are strengthened by the exterior angle-strips of metal, *f*, running the whole length of the screen.

Having described our invention, what we claim as new, and desire to secure by Letters Patent, is—

1. A revolving screen having its shell constructed of tubing, arranged at right angles to the supporting-shaft and forming a continuous fluted surface throughout the screen, and having their points of intersection strengthened by exterior angle-strips running the whole length of the screen, as described, and for the purpose set forth.

2. The combination, with a revolving screen, of the oscillating journal-box $f$, supporting one end of the screen-shaft, and the grooved cam $i$, mounted on a transverse shaft, with the lever $k$ and segment I, for supporting and adjusting the other end of the screen-shaft, substantially as described.

In testimony whereof we have hereunto signed our names.

DAVID TALMAGE.
MARTIN L. FLOWERS.

In presence of—
J. C. HUBBELL,
P. J. FINNEY.